US008908709B1

(12) United States Patent
Aybay

(10) Patent No.: US 8,908,709 B1
(45) Date of Patent: Dec. 9, 2014

(54) METHODS AND APPARATUS FOR POWER MANAGEMENT ASSOCIATED WITH A SWITCH FABRIC

(75) Inventor: Gunes Aybay, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 288 days.

(21) Appl. No.: 12/350,729

(22) Filed: Jan. 8, 2009

(51) Int. Cl.
H04L 12/54 (2013.01)
H04L 12/933 (2013.01)
H04L 12/861 (2013.01)
H04Q 3/68 (2006.01)

(52) U.S. Cl.
CPC ........... H04L 49/90 (2013.01); H04L 49/1546 (2013.01); H04Q 3/68 (2013.01)
USPC ........... 370/413; 370/412; 370/388; 370/351; 370/389

(58) Field of Classification Search
USPC ......... 370/216, 235, 238, 351, 359, 377, 378, 370/381, 388, 389, 392, 395.1, 401, 395.4, 370/412, 395.42, 413, 419, 465; 710/305, 710/316; 709/230, 238
See application file for complete search history.

(56) References Cited

U.S. PATENT DOCUMENTS

| | | | |
|---|---|---|---|
| 5,502,689 A | 3/1996 | Peterson et al. | |
| 5,524,096 A * | 6/1996 | Roohparvar | 365/194 |
| 6,308,240 B1 | 10/2001 | De Nicolo | |
| 6,446,213 B1 | 9/2002 | Yamaki | |
| 6,907,534 B2 | 6/2005 | Ku | |
| 6,985,969 B1 | 1/2006 | Cheng | |
| 6,996,651 B2 * | 2/2006 | Garinger et al. | 710/305 |
| 7,139,860 B2 * | 11/2006 | Walker et al. | 710/306 |
| 7,154,902 B1 * | 12/2006 | Sikdar | 370/412 |
| 7,228,441 B2 | 6/2007 | Fung | |
| 7,287,148 B2 | 10/2007 | Kanapathippillai et al. | |
| 7,320,080 B2 * | 1/2008 | Solomon et al. | 713/320 |
| 7,353,415 B2 | 4/2008 | Zaretsky et al. | |
| 7,356,033 B2 | 4/2008 | Basu et al. | |
| 2002/0138777 A1 * | 9/2002 | Feierbach | 713/324 |
| 2004/0044915 A1 * | 3/2004 | Bose et al. | 713/320 |
| 2004/0163001 A1 | 8/2004 | Bodas | |
| 2005/0097371 A1 | 5/2005 | Broyles | |
| 2005/0215275 A1 * | 9/2005 | Edwards et al. | 455/522 |
| 2006/0080560 A1 * | 4/2006 | Miller | 713/300 |
| 2006/0156041 A1 | 7/2006 | Zaretsky et al. | |
| 2006/0206730 A1 | 9/2006 | Cartes et al. | |
| 2006/0206737 A1 | 9/2006 | Lee | |
| 2007/0074054 A1 * | 3/2007 | Chieh | 713/300 |
| 2007/0266264 A1 | 11/2007 | Lewites et al. | |

OTHER PUBLICATIONS

U.S. Appl. No. 12/347,680, filed Dec. 31, 2008, entitled "Methods and Apparatus for Provisioning and Managing Power" (28 pgs).

(Continued)

*Primary Examiner* — Hassan Phillips
*Assistant Examiner* — Mark A Mais
(74) *Attorney, Agent, or Firm* — Cooley LLP

(57) ABSTRACT

In one embodiment, a method includes receiving a request to transmit data from a first queue to a second queue via a switch fabric. In response to the receiving, a wake-up signal configured to trigger a stage of a processing pipeline in communication with the second queue to change from a standby state to an active state is sent.

23 Claims, 7 Drawing Sheets

(56) References Cited

OTHER PUBLICATIONS

U.S. Appl. No. 12/347,688, filed Dec. 31, 2008, entitled "Methods and Apparatus for Provisioning and Managing Power" (27 pgs).
U.S. Appl. No. 12/797,996, filed Jun. 10, 2010, entitled "Dynamic Fabric Plane Allocation for Power Savings" (55 pgs).
Office Action mailed May 11, 2011 for U.S. Appl. No. 12/347,680 (15 pages).
Office Action mailed May 10, 2011 for U.S. Appl. No. 12/347,688 (13 pages).
Final Office Action mailed Nov. 1, 2011 for U.S. Appl. No. 12/347,680.
Office Action mailed Oct. 13, 2011 for U.S. Appl. No. 12/347,688.
Final Office Action mailed Feb. 13, 2012 for U.S. Appl. No. 12/347,688.

* cited by examiner

METHODS AND APPARATUS FOR POWER MANAGEMENT ASSOCIATED WITH A SWITCH FABRIC

BACKGROUND

Embodiments described herein relate generally to power management, and, in particular, to a methods and apparatus for power management associated with a switch fabric.

As switch fabrics and/or devices associated with these switch fabrics have been scaled to meet the growing demand for network capacity to service, for example, high-bandwidth applications such as streaming media (e.g., music, video) and telephony applications, power consumption of the switch fabrics and/or interconnected devices associated with the switch fabrics have become a concern. For example, known devices associated with switch fabrics consume constant and relatively large quantities of energy because these known devices are configured to remain fully active regardless of the level of network traffic flowing through them. Some known devices, for example, have been configured to reduce their power consumption through concentrated processing on selected devices and/or through reduced clock rates at low traffic times. But a decrease in clock rate and/or shifting of workload to selected devices can result in undesirable network congestion. In addition, desirable power savings are not achieved during normal and peak traffic time periods, which can be unpredictable.

Thus, a need exists for methods and apparatus related to power management associated with a switch fabric to address the shortfalls of existing power management technology.

SUMMARY

In one embodiment, a method includes receiving a request to transmit data from a first queue to a second queue via a switch fabric. In response to the receiving, a wake-up signal configured to trigger a stage of a processing pipeline in communication with the second queue to change from a standby state to an active state is sent.

DETAILED DESCRIPTION

Figure 1:
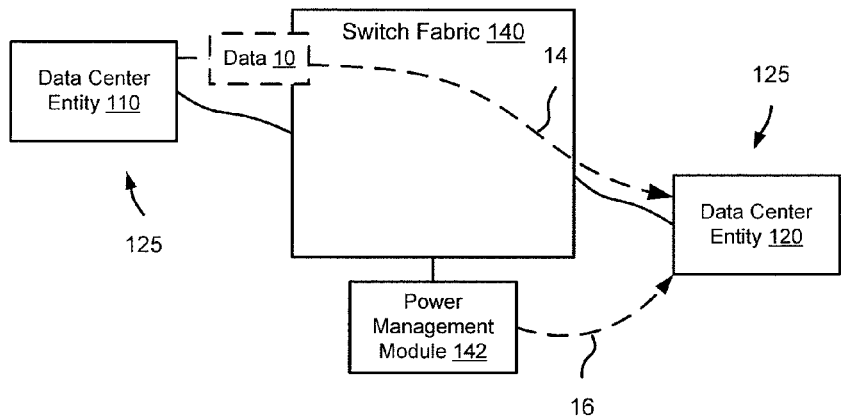
FIG. 1 is a schematic diagram that illustrates a power management module configured to send a wake-up signal to a data center entity, according to an embodiment.

A power management module can be configured to trigger a portion of a data center entity associated with a switch fabric to change from one power state (e.g., a standby state) to another power state (e.g., an active state). In some embodiments, the portion of the data center entity can be a portion of a processing pipeline included within the data center entity. The data center entity can be, for example, an access switch or a host device such as a server configured to execute more than one virtual machine. The data center entity and/or the switch fabric can be a component within a data center. In some embodiments, the switch fabric can define a core portion of the data center.

In some embodiments, the power management module can be configured to trigger the portion of the data center entity to change from one power state to another power state in response to data being received. In some embodiments, the power management module can be configured to trigger the portion of the data center entity to change from one power state to another power state in response to a signal from a schedule module associated with the switch fabric and/or included in the data center entity. In some embodiments, the power management module can be configured to trigger a change in power state of the portion of the data center entity, for example, in response to a request to transmit data via a switch fabric.

In some embodiments, the power management module can be configured to trigger a change in power state of a portion of a data center entity using, for example, a wake-up signal and/or a sleep signal. The wake-up signal and/or the sleep signal can have one or more parameter values configured to trigger one or more power management related functions to be performed.

In some embodiments, a power management module can be configured to trigger one or more initial stages of a processing pipeline to change from a standby state to an active state (if not already in the active state) in response to data being received at a physical-layer interface device. One or more stages after the initial stage(s) within the processing pipeline can be triggered (e.g., serially triggered, sequentially triggered) by the power management module to change from a standby state to an active state as the data is processed through the processing pipeline. The processing pipeline can be, for example, a classification module associated with a switch fabric. After the data has been processed by the processing pipeline, the data can be sent to a switch fabric.

In some embodiments, a portion of a data center entity can be in a standby state for a relatively long period of time when data is sparsely transmitted. Accordingly, significant power savings can be achieved by changing a portion of the data center entity to a standby state for a period of time. For example, the processing of a data packet through a portion of the data center entity can be short compared with a time period between receipt of the data packet and receipt of a subsequent data packet for processing. For example, the data packet processing time can be several nano-seconds while the time period between data packets can be several micro-seconds.

FIG. 1 is a schematic diagram that illustrates a power management module 142 configured to send a wake-up signal 16 to a data center entity 120, according to an embodiment. Specifically, the power management module 142 is configured to send the wake-up signal 16 before data 10 is received at data center entity 120 from data center entity 110. As shown in FIG. 1, the data 10 is transmitted from the data center entity 110 to the data center entity 120 through a switch fabric 140 (shown as the dashed line 14). The data center entity 110 and the data center entity 120 can collectively be referred to as processing entities 125. The data 10 can be, for example, a cell (e.g., a fixed size cell, a variable size cell) that includes one or more data packets (e.g., an Ethernet packet), a string of bit values, a control instruction, a payload of data, and so forth.

The wake-up signal 16 can be configured to trigger a portion of the data center entity 120 to change from a standby state to an active state so that the portion of the data center entity 120 can process the data 10. In some embodiments, the standby state and the active state can be referred to as power states or power level states. In some embodiments, changing from a standby state to an active state can be referred to as waking up. In some embodiments, when in the active state the portion of the data center entity 120 can be ready to process data (e.g., powered and waiting to process data such as data 10) or can be actively processing data. In some embodiments, the standby state can be a low power state where the portion of the data center entity 120 uses substantially no energy or a relatively small amount of energy compared with an amount of energy used by the data center entity 120 when in the active state. In some embodiments, the standby state can be an off-state where energy is not consumed by the portion of the data center entity 120 that is in the standby state. In some embodiments, transistors (e.g., complementary metal-oxide-semiconductor (CMOS) transistors) within the portion of the data center entity 120 can be held in specified logical state when in standby state. In some embodiments, the standby state can be referred to as a standby mode or as an idle mode/state, and the active state can be referred to as an active mode or as a processing mode/state.

In some embodiments, a portion of the data center entity 120 can be configured to remain in an active state for a specified period of time after the wake-up signal 16 has triggered a change from a standby state to the active state. Specifically, the portion of the data center entity 120 can be configured to return to the standby state when the time period expires. In some embodiments, the time period can be managed by a standby timer module (not shown) that can be local to the data center entity 120 (e.g., included in the data center entity 120).

In some embodiments, a portion of the data center entity 120 that changes from the standby state to an active state in response to the wake-up signal 16 can be, for example, one or more modules (e.g., a memory module, a data processing module, a control module, a hardware module, a module included in a card) within the data center entity 120 or a portion of a module of the data center entity 120. For example, the portion of the data center entity 120 can be a portion of a processing pipeline (not shown) within the data center entity 120. In some embodiments, the portion of the data center entity 120 can include the entire data center entity 120. In some embodiments, a portion of the data center entity 120 that changes from a standby state to an active state in response to the wake-up signal 16 can be referred to as a target of the wake-up signal 16.

In some embodiments, one or more of the processing entities 125 can be, for example, a server device and/or can be configured to function as an access switch (e.g., a gateway device, a network device) between the switch fabric 140 and one or more devices, such as a host device, which can be configured to handle data based on different protocols. In some embodiments, one or more of the processing entities 125 can be configured to function as a router, a network hub device, and/or a network bridge device. In some embodiments, one or more of the processing entities 125 can have a processing pipeline configured to process the data 10. More details related to communication between a host device, an access switch, and processing pipelines are described in connection with FIG. 2.

In some embodiments, the processing entities 125 and the switch fabric 140 can be included within at least a portion of a data center. The data center can include a network or interconnection of devices. In some embodiments, the switch fabric 140 can define a core portion of the data center. In some embodiments, more processing entities than those shown in FIG. 1 can be in communication with processing entities 125 and/or the switch fabric 140.

In some embodiments, the wake-up signal 16 can be a binary indicator. For example, the wake-up signal 16 can be a signal defined by a high voltage or a low voltage, or a set bit value (e.g., a "1" bit value). In some embodiments, the portion of the data center entity 120 can be configured to change from the standby state to the active state in response to a change in the binary indicator that defines the wake-up signal 16. In some embodiments, the data center entity 120 can be configured to interpret the binary indicator that defines the wake-up signal 16, and can cause a portion of the data center entity 120 to change from the standby state to the active state based on the binary indicator.

In some embodiments, the wake-up signal 16 can be an instruction. For example, the wake-up signal 16 can be a sequence of bit values that can be interpreted by or can be configured to trigger a processing module (not shown) at the data center entity 120 to change a portion of the data center entity 120 from a standby state to an active state in a specified fashion. Specifically, the wake-up signal 16, if defined as an instruction, can include various parameter values configured to trigger various power management operations (also can be referred to as power management functions). For example, the wake-up signal 16 can include a target parameter value, a duration parameter value, and so forth. Various parameter values that can be included in a wake-up signal 16 are described below.

In some embodiments, the wake-up signal 16 can be configured to trigger a specified portion of the data center entity 120 to change from a standby state to an active state based on a target parameter value. In other words, the wake-up signal 16 can target a specified portion of the data center entity 120 via the target parameter value. For example, a target parameter value included in the wake-up signal 16 can trigger the data center entity 120 to change a particular module or stage of a processing pipeline within the data center entity 120 to change from a standby state to an active state.

A portion of the data center entity 120 can be configured to change from a standby state to an active state, and remain in an active state for a specified period of time in response to a duration parameter value included in the wake-up signal 16. In some embodiments, an active time period of a portion of the data center entity 120 (after being triggered to wake up) can be defined in response to an instruction included in the wake-up signal 16. The active time period can be determined by a standby timer module. The portion of the data center entity 120 can remain in an active state until a time period of the standby timer module expires. Upon expiration of the time period, the portion of the data center entity 120 can return to a standby state.

In some embodiments, if a portion of the data center entity 120 that is a target of the wake-up signal 16 is already in the active state when the wake-up signal 16 is received, the portion of the data center entity 120 can remain in the active state. In some embodiments, the wake-up signal 16 can trigger the portion of the data center entity 120 to remain in the active state for a longer period of time than the portion of the data center entity 120 would have remained in the active state had the wake-up signal 16 not be received. For example, a standby reset parameter value included in the wake-up signal 16 can be configured to trigger the data center entity 120 to reset a time period of a standby timer module associated with a portion of the data center entity 120 targeted by the wake-up signal 16.

Although not shown, in some embodiments, the power management module 142 can be configured to determine whether or not a target portion of the data center entity 120 is in an active state or a standby state before the wake-up signal 16 is sent to the data center entity 120. For example, the power management module 142 can be configured to send the wake-up signal 16 when the power management module 142 determines that a target portion of the data center entity 120 is in a standby state or will change to a standby state within a specified period of time.

The power management module 142 can be configured to request information from the data center entity 120 related to a power state (also can be referred to as power state information) of a target portion of the data center entity 120. In response, the data center entity 120 can be configured to send at least the requested power state information to the power management module 142. In some embodiments, the power management module 142 can be configured to request the power state information periodically (e.g., based on a regular interval), at random times, in response to the data 10 being received at the switch fabric 140, and so forth.

In some embodiments, the data center entity 120 can be configured to send power state information to the power management module 142 without the power state information being requested by the power management module 142. The data center entity 120 can be configured to send power state information related to one or more portions of the data center entity 120 that could be a target of a wake-up signal such as wake-up signal 16. In some embodiments, the data center entity 120 can be configured to send the power state information periodically (e.g., based on a regular interval), at random times, and so forth.

In some embodiments, the wake-up signal 16 can include a wake-time parameter value configured to trigger a portion of the data center entity 120 to wake-up at a specified time. For example, the wake-time parameter value can be configured to trigger a portion of the data center entity 120 to wake up when a specified time period has expired. In other words, the wake-up signal 16 can be configured to trigger the portion of the data center entity 120 to delay changing from a standby state to an active state for a specified period of time. In some embodiments, the specified time period can start when the wake-up signal 16 is received at the data center entity 120. In some embodiments, the wake-time parameter value can be configured to trigger a portion of the data center entity 120 to wake up at a specified day/time.

The wake-up signal 16 can be defined by the power management module 142 and/or sent from the power management module 142 based on the processing of the data 10. For example, in some embodiments, the wake-up signal 16 can be defined and/or sent from the power management module 142 when the data 10 is scheduled for (e.g., queued for) transmission across the switch fabric 140, received at the switch fabric 140, being transmitted across the switch fabric 140, and/or queued for transmission from the switch fabric 140. In some embodiments, the wake-up signal 16 can be defined at a specified time before the wake-up signal 16 is sent from the power management module 142. In some embodiments, the wake-up signal 16 can be defined and/or sent from the power management module 142 when the data 10 is scheduled for (e.g., queued for) transmission across the switch fabric 140 from the data center entity 110, received at the data center entity 110, being transmitted from the data center entity 110 for transmission across the switch fabric 140, and/or queued for transmission from the data center entity 110. More details related to the timing for defining and sending a wake-up signal 16 are discussed in connection with FIG. 2.

In some embodiments, the wake-up signal 16 can be defined at the power management module 142 based on the data 10. For example, the wake-up signal 16 can be configured to trigger a first portion of the data center entity 120, rather than a second portion of the data center entity 120, to change from a standby state to an active state because the data 10 is to be processed at the first portion of the data center entity 120 rather than the second portion of the data center entity 120. In some embodiments, the wake-up signal 16 can be configured to trigger a portion of the data center entity 120 to change from a standby state to an active state, and remain in the active state for a specified period of time based on a quantity of the data 10 (e.g., a bit length, a byte length). In some embodiments, the wake-up signal 16 can be configured to trigger a portion of the data center entity 120 to change from a standby state to an active state, and remain in the active state for a relatively long period of time because the data 10 is a leading edge of a series of data (not shown).

Although not shown, in some embodiments, the power management module 142 can be configured to send a sleep signal to the data center entity 120. The sleep signal can be configured to trigger a portion of the data center entity 120 to change from an active state to a standby state. The sleep signal can be defined when data is not scheduled by, for example, a schedule module (not shown) of the switch fabric 140, for transmission to the data center entity 120 via the switch fabric 140. Specifically, the power management module 142 can be triggered by the schedule module to define and sent the sleep signal when data is not scheduled by the schedule module for transmission via the switch fabric 140, for example, for a specified period of time.

The sleep signal can have substantially the same functionality as the wake-up signal, but with respect to a standby state rather than an active state. For example, the sleep signal can have a duration parameter value configured to trigger a portion of the data center entity 120 to remain in a standby state for a specified period of time or a standby-time parameter value configured to trigger the portion of the data center entity 120 to change from an active state to a standby state at a specified time.

In some embodiments, the power management module 142 can be configured to send signals related to power management such as the wake-up signal 16 or a sleep signal via the switch fabric 140. In some embodiments, the power management module 142 can be configured to send signals related to power management via a transmission path (not shown), such as an out-of-band transmission path, separate from a transmission path through which the data 10 is sent. For example, one or more signals related to power management can be sent via a link dedicated to transmission of signals related to power management, routing control, and/or data flow control.

The switch fabric 140 can be a multi-stage switch fabric (e.g., 3-stage switch fabric, 5-stage switch fabric). For example, although not shown, the switch fabric 140 can include an ingress stage, a middle stage, and an egress stage.

In some embodiments, the switch fabric 140 can be a reconfigurable (e.g., a rearrangeable) switch fabric and/or a time-division multiplexed switch fabric. In some embodiments, the switch fabric 140 can be a cell-based switch fabric configured to transmit one or more cells (e.g., fixed-size cells, variable-size cells) that can include various type of data such as portions of one or more data packets. In some embodiments, the switch fabric 140 can be a lossless or substantially lossless switch fabric (e.g., not based on lossy best-effort transmission protocol). In some embodiments, switch fabric 140 can be defined based on a Clos network architecture (e.g., a strict sense non-blocking Clos network, a Benes network) and the switch fabric 140 can include a data plane and a control plane.

As shown in FIG. 1, the power management module 142 can be disposed outside of the switch fabric 140. In some embodiments, the power management module 142 can be included in a component configured to manage transmissions of data such as data 10 via the switch fabric 140. Although not shown, in some embodiments, the power management module 142 can be included in a line card associated with the switch fabric 140 (e.g., an ingress line card associated with an ingress stage of the switch fabric 140, an egress line card associated with an egress stage of the switch fabric 140).

In some embodiments, one or more portions of the power management module 142 can be a hardware-based module (e.g., a digital signal processor (DSP), a field programmable gate array (FPGA)) and/or a software-based module (e.g., a module of computer code, a set of computer-readable instructions that can be executed at a computer). In some embodiments, one or more of the functions associated with power management module 142 can be included in one or more different modules (not shown).

Figure 2:
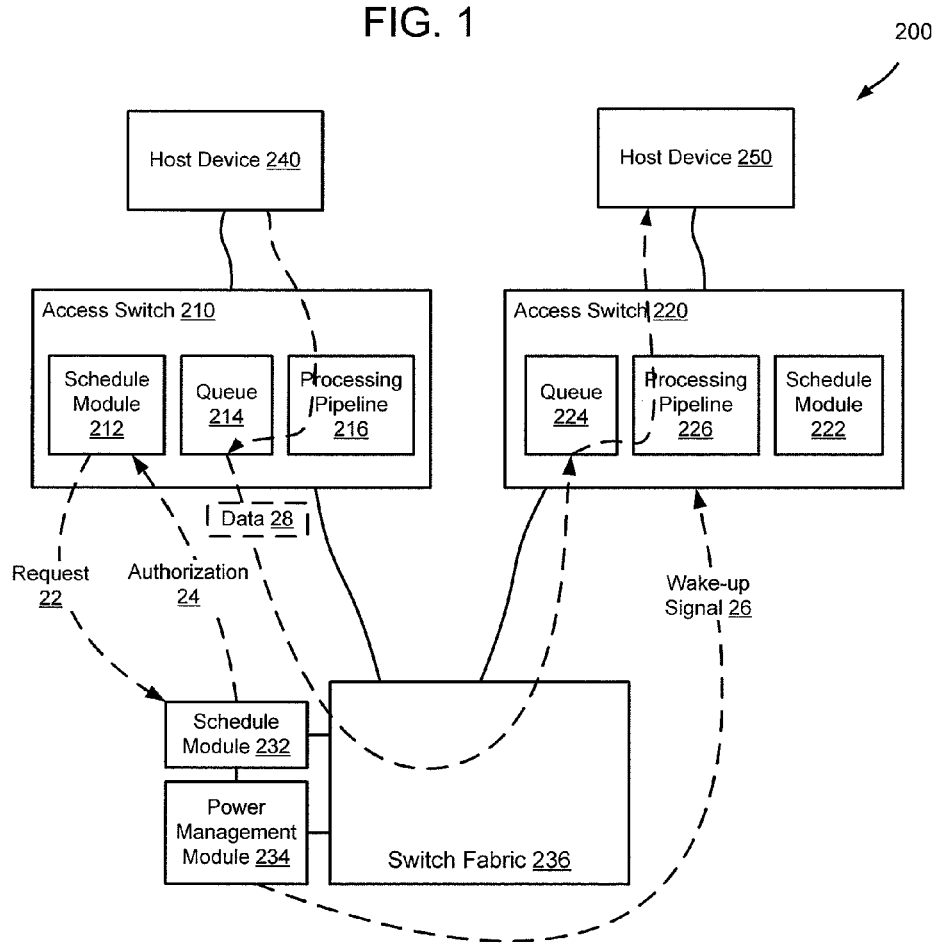
FIG. 2 is a schematic diagram of a data center that includes a power management module configured to send a wake-up signal to an access switch, according to an embodiment.

FIG. 2 is a schematic diagram of a data center 200 that includes a power management module 234 configured to send a wake-up signal 26 to an access switch 220, according to an embodiment. The wake-up signal 26 is sent to the access switch 220 before data 28 (e.g., a data packet) is received at a portion of the processing pipeline 226 of the access switch 220. Specifically, the wake-up signal 26 is configured to trigger the portion of the processing pipeline 226 to change from a standby state to an active state (if the portion of the processing pipeline 226 is in a standby state) so that the data 28 can be processed at the portion of the processing pipeline 226.

As shown in FIG. 2, the data 28 is sent from a host device 240 to an access switch 210 where the data 28 is processed through a processing pipeline 216. The data 28 is queued in a queue 214 until the data 28 is transmitted from access switch 210 via a switch fabric 236 to the access switch 220. The data 28 is received at a queue 224 of the access switch 220 and then processed through a processing pipeline 226. In some embodiments, the queue 214 can be included in the processing pipeline 216, and the queue 224 can be included in the processing pipeline 226. In this embodiment, the access switch 210 can be referred to as a source access switch, and the access switch 220 can be referred to as a destination access switch.

The data 28 is queued at queue 214 until the access switch 210 is authorized to send (e.g., transmit) the data 28 to the switch fabric 236. As shown in FIG. 2, a schedule module 212 of the access switch 210 can be configured to send a request 22 to a schedule module 232 (e.g., a schedule module associated with an egress stage of the switch fabric 236, a schedule module associated with an ingress stage of the switch fabric 236) associated with the switch fabric 236. The request 22 can be a request to transmit the data 28 via the switch fabric 236 to access switch 220. If the transmission of data 28 is authorized, the schedule module 232 can be configured to send an authorization 24 to the access switch 210. In response to the authorization, the access switch 210 can be configured to send the data 28 to the switch fabric 236. More details related to requests and authorizations for transmitting data via a switch fabric are set forth in co-pending patent application bearing Ser. No. 12/343,728, filed on Dec. 24, 2008, entitled "Methods and Apparatus for Transmission of Groups of Cells via a Switch Fabric," which is incorporated herein by reference in its entirety.

The wake-up signal 26 can be defined and/or sent in response to various events. The power management module 234 can be configured to receive an indicator of these events. For example, the wake-up signal 26 can be defined and/or sent in response to the request 22 to transmit the data 28 via the switch fabric 236 being authorized by the schedule module 232. Specifically, the power management module 234 can be triggered by the schedule module 232 to define and send the wake-up signal 26 when the schedule module 232 determines that request 22 should be authorized. Accordingly, the wake-up signal 26 can be sent from the power management module 234 before, after, or substantially simultaneously with the sending of the authorization 24 from the schedule module 232. In some embodiments, the wake-up signal 26 can be defined in response to the request 22 being received at the schedule module 232, and the wake-up signal 26 can be sent in response to authorization 24 being sent from the schedule module 232.

One or more parameter values, such as those described in connection with FIG. 1, can be defined based information provided by the schedule module 232. For example, the schedule module 232 can be configured to send the authorization 24 to transmit data 28 because a queue (not shown) on the egress side of the switch fabric 236 can handle transmission of the data 28 via the switch fabric 236 when the data 28 can be classified as a specified data type (e.g., a control signal data type, a media signal data type). An indicator of the data type of the data 28 can be communicated to the power management module 234. The power management module 234 can be configured to define, based on the data type, the wake-up signal 26 to trigger a specified portion of the processing pipeline 226 to wake-up. The specified portion of the processing pipeline 226 can be configured to process the data type. More details related to triggering a specified portion of a processing pipeline to change from one power state to another power state are described in connection with FIGS. 5 through 8.

Although not shown, the request 22 to transmit the data 28 can be denied by the schedule module 232 because the switch fabric 236 is congested. In such cases, the power management module 234 can be configured to send a sleep signal to the access switch 220. The sleep signal can be configured to trigger the processing pipeline 226 to change from an active state (if not processing data) to a standby state, to change from an active state to a standby state when processing of data is completed (if processing data), or to remain in a standby state (if already in a standby state).

In some embodiments, the processing pipeline 216 and/or the processing pipeline 226 can be any type of processing pipeline configured to process the data 28. For example, processing pipeline 226 can be configured to translate the data 28 from one protocol into another protocol (e.g., from a cell-based protocol to an Ethernet protocol). In some embodiments, the processing pipeline 216 can be configured to classify the data 28 so that the data 28 can be routed. Specifically, the processing pipeline 216 can be configured to determine based on a classification algorithm implemented in the processing pipeline 216 that the data 28 should be sent to host device 250. The processing pipeline 216 can be configured to send an instruction to the switch fabric 236 that can trigger the switch fabric 236 to route the data 28 to the access switch 220 so that the data can be transmitted to the host device 250.

Host device 240 and/or host device 250 can be any type of device configured to execute various applications such as virtual resources (e.g., virtual resources that can be migrated between host device 240 and host device 250). For example, the host device 240 can be configured to send the data 28 over the switch fabric 236 to a virtual resource within host device 250 via access switch 220. Similarly, the host device 240 can be configured to receive data (not shown) from a source entity, such as a virtual resource within host device 250, over the switch fabric 236 via the access switch 220. In this embodiment, the host device 240 can be referred to as a source host device, and the host device 250 can be referred to as a destination host device.

In some embodiments, the functionality of the host device 240 and/or host device 250 can be substantially separate from functions related to, for example, routing and management of data via the switch fabric 236. For example, host device 240 can be a server device (e.g., a web server device) configured to host several guest operating systems handling data for, for example, a user/customer while the functionality of the access switch 210 can be substantially related to routing and management of data via the switch fabric 236. In some embodiments, the host device 240 and the access switch 210 can be controlled by different administrative entities (e.g., different administrative organizations).

In some embodiments, access switch 210 and/or access switch 220 can be configured to function as a gateway device between the switch fabric 236 and their respective host devices—host device 240 and host device 250. For example, access switch 210 can function as a gateway device between host device 240, which can be configured to operate based on one protocol, and the switch fabric 236, which can be configured to operate based on a different protocol. In some embodiments, access switch 210 can be configured to function as a gateway device between host device 240, which can be configured to communicate based on an Ethernet protocol, and the switch fabric 236, which can be a cell-based fabric where one or more portions of data (e.g., portions of data packets) are transmitted via the switch fabric 236 in one or more cells (e.g., variable size cells, fixed size cells). In other words, access switch 210 and/or access switch 220 can be configured to provide one or more devices configured to communicate via one protocol with access to the switch fabric 236, which can be configured to communicate via another protocol. In some embodiments, access switch 210 and/or access switch 220 can be referred to as a network device. In some embodiments, the access switch 210 and/or access switch 220 can be included in a top-of-rack (TOR) of a chassis.

Although not shown, in some embodiments, the data center entity 210 and/or data center entity 220 can be configured to function as a gateway device for multiple host devices (not shown). For example, routing functionality between virtual resources at the multiple host devices can be performed at an access switch such as access switch 210. This capability can facilitate scaling of host devices configured to access, for example, a switch fabric such as switch fabric 140 via an access switch in a desirable fashion.

Although not shown, in some embodiments, the functions associated with the schedule module 232 and/or the functions associated with the power management module 234 can be included in one or more different modules than shown in FIG. 2. For example, the functions associated with the schedule module 232 and the functions associated with the power management module 234 can be included in a single module.

Figure 3:
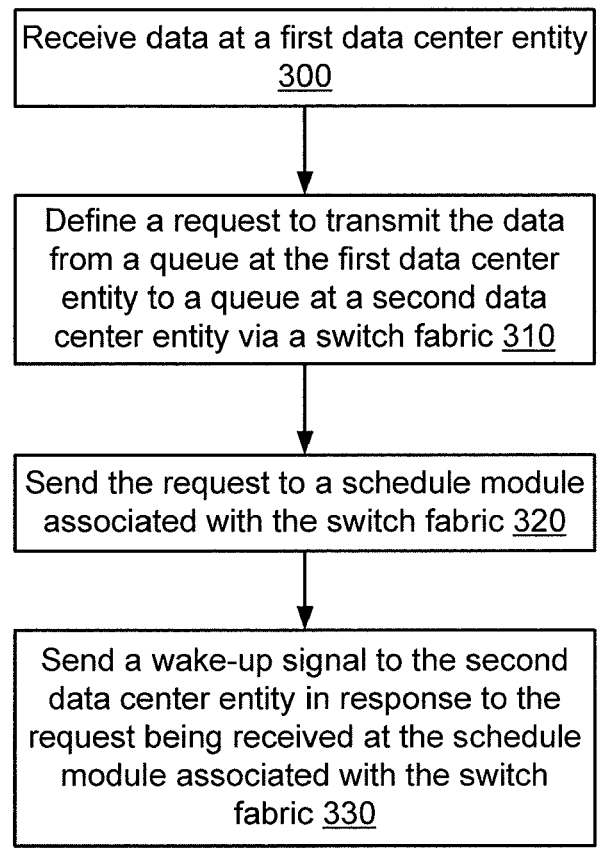
FIG. 3 is a schematic flowchart that illustrates a method for sending a wake-up signal to a data center entity in response to a request, according to an embodiment.

FIG. 3 is a schematic flowchart that illustrates a method for sending a wake-up signal to a data center entity in response to a request, according to an embodiment. As shown in FIG. 3, data is received at a first data center entity, at 300. The first data center entity can be, for example, a computing device such as a server or an access switch. If the first data center entity is an access switch, the data can be received from a host device.

A request to transmit the data from a queue at the first data center entity to a queue at a second data center entity via a switch fabric is defined, at 310. In some embodiments, the request can be defined in response to the data being received at the first data center entity. In some embodiments, the request can be defined at a schedule module associated with the first data center entity. In some embodiments, the request can be defined based on classification of the data based on, for example, a packet classification algorithm. The data can be temporarily stored in the queue until authorization to transmit the data is received. In some embodiments, the queues and the switch fabric can be included within a multi-stage switch. In some embodiments, the queues can be included in a network entity that is not a data center entity, and the switch fabric can be a switch fabric that is not associated with a data center.

The request is sent to a schedule module associated with the switch fabric, at 320. The switch fabric can be, for example, a multi-stage switch fabric. In some embodiments, the schedule module can be configured to schedule transmissions via the switch fabric. In some embodiments, the schedule module can be referred to as an orchestrating schedule module. In some embodiments, the schedule module can be an ingress schedule module on an ingress side of the switch fabric and can be configured to send and/or receive authorization from an egress schedule module on an egress side of the switch fabric. In some embodiments, the schedule module can be an egress schedule module on an egress side of the switch fabric. In some embodiments, the schedule module can be an ingress schedule module on an ingress side of the switch fabric or an egress schedule module on an egress side of the switch fabric.

A wake-up signal is sent to the second data center entity in response to the request being received at the schedule module associated with the switch fabric, at 330. The wake-up signal can be defined at a power management module in response to an indicator that the request has been received at the schedule module. The wake-up signal can include one or more parameter values configured to trigger one or more power management functions to be performed at the second data center entity. For example, the wake-up signal can be configured to trigger a portion of the second data center entity to change from a standby state to an active state for a specified period of time so that the portion of the second data center entity can be ready to process the data when received at the second data center entity. In some embodiments, the parameter value(s) can be defined based on one or more characteristics associated with the data.

Figure 4:
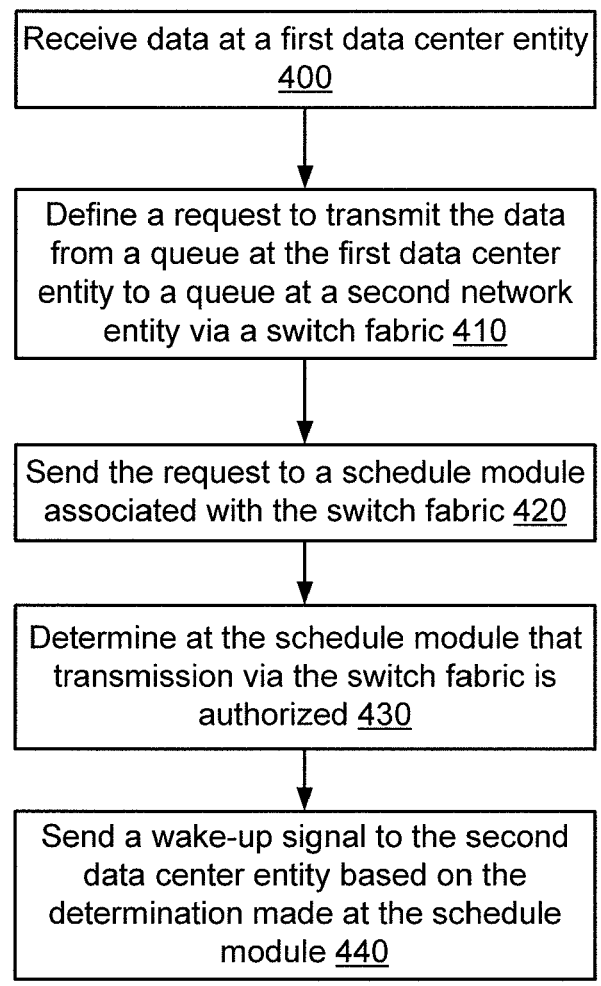
FIG. 4 is a schematic flowchart that illustrates a method for sending a wake-up signal to a data center entity in response to an authorization to transmit data, according to an embodiment.

FIG. 4 is a schematic flowchart that illustrates a method for sending a wake-up signal to a data center entity in response to an authorization to transmit data, according to an embodiment. As shown in FIG. 4, data is received at a first data center entity, at 400. The first data center entity can be, for example, a computing device such as a server or an access switch. If the first data center entity is an access switch, the data can be received from a host device.

A request to transmit the data from a queue at the first data center entity to a queue at a second data center entity via a switch fabric is defined, at 410. In some embodiments, the request can be defined in response to the data being received at the first data center entity. In some embodiments, the request can be defined at a schedule module associated with the first data center entity. In some embodiments, the request can be defined based on classification of the data based on, for example, a packet classification algorithm. The data can be temporarily stored in the queue at the first data center entity until authorization to transmit the data is received.

The request is sent to a schedule module associated with the switch fabric, at 420. The switch fabric can be, for example, a multi-stage switch fabric. In some embodiments, the schedule module can be configured to schedule transmissions via the switch fabric. In some embodiments, the schedule module can be referred to as an orchestrating schedule module. In some embodiments, the schedule module can be an ingress schedule module on an ingress side of the switch fabric and can be configured to send and/or receive authorization from an egress schedule module on an egress side of the switch fabric. In some embodiments, the schedule module can be an egress schedule module on an egress side of the switch fabric. In some embodiments, the schedule module can be an ingress schedule module on an ingress side of the switch fabric or an egress schedule module on an egress side of the switch fabric.

The schedule module determines that transmission via the switch fabric is authorized, at 430. The schedule module can be configured to determine that transmission via the switch fabric is authorized based on a policy associated with, for example, a congestion level associated with the switch fabric. For example, the schedule module can be configured to determine that transmission via the switch fabric to an egress port is authorized when the schedule module receives an indicator that the egress port is available to receive the data. In some embodiments, the schedule module can monitor an egress queue associated with the egress port and can determine that the egress port is available to receive the data based on a utilization level of the egress queue being below a specified threshold level.

Send a wake-up signal to the second data center entity based on the determination at the schedule module, at 440. The wake-up signal can be defined at a power management module in response to an indicator that the request has been authorized at the schedule module. The wake-up signal can include one or more parameter values configured to trigger one or more power management functions to be performed at the second data center entity. For example, the wake-up signal can be configured to trigger a portion of the second data center entity to change from a standby state to an active state for a specified period of time so that the portion of the second data center entity can be ready to process the data when received at the second data center entity. In some embodiments, the parameter value(s) can be defined based on one or more characteristics associated with the data.

Figure 5:
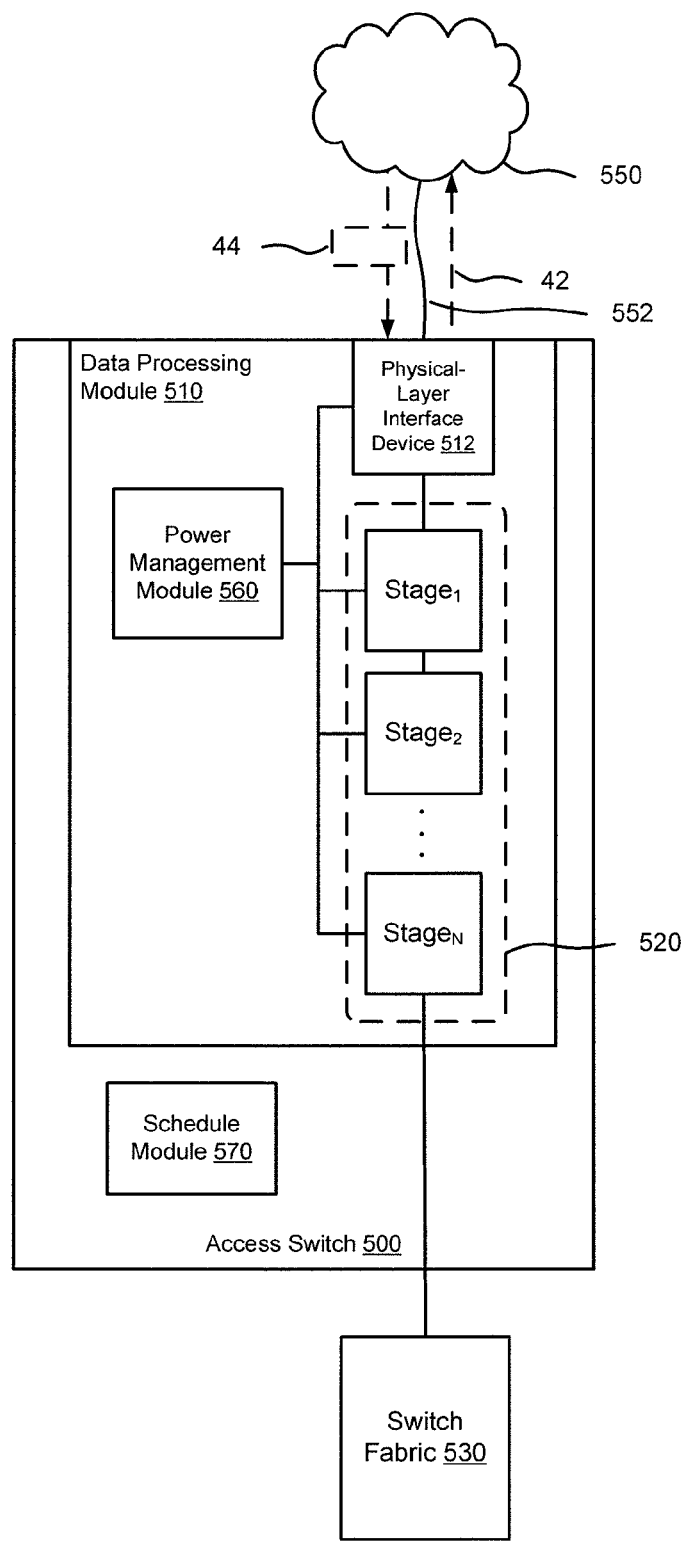
FIG. 5 is a schematic diagram that illustrates a power management module associated with a processing pipeline of a data processing module, according to an embodiment.

FIG. 5 is a schematic diagram that illustrates a power management module 560 and a processing pipeline 520 of a data processing module 510, according to an embodiment. The processing pipeline 520 includes stages 1 through N (i.e., $stage_1, stage_2 \ldots stage_N$), which can collectively be referred to as stages of the processing pipeline 520. The stages of the processing pipeline 520 can be configured to process data received at the physical-layer interface device 512 of the data processing module 510. The stages at the beginning of the processing pipeline 520 (starting at $stage_1$) can be referred to as initial stages or beginning stages of the processing pipeline 520. As shown in FIG. 5, $stage_N$ of the processing pipeline 520 can be configured to send data to a switch fabric 530 (e.g., a multi-stage switch fabric defining a core portion of a data center). In some embodiments, the stages of the processing pipeline 520 can be associated with, for example, translating the data 44 into a specified protocol or classification of the data 44 for routing via the switch fabric 530.

The power management module 560 is configured to trigger the initial stages (e.g., $stage_1$, $stage_1$ and $stage_2$) of the processing pipeline 520 to change from a standby state to an active state (if not in the active state) in response to data 44 being received at the physical-layer interface device 512. Stages after the initial stages within the processing pipeline 520 can be serially (e.g., sequentially) triggered by the power management module 560 to change from a standby state to an active state as the data 44 is processed through the processing pipeline 520 until the data 44 is sent to the switch fabric 530. For example, the power management module 560 can be configured to trigger $stage_1$ of the processing pipeline 520 to change from a standby state to an active state in response to an indicator from the physical-layer interface device 512 that the data 44 has been received from at least a portion of the network 550. As the data is being processed at $stage_1$ of the processing pipeline 520, the power management module 560 can be configured to trigger $stage_2$ (can be referred to as a subsequent stage) of the processing pipeline 520 to change from a standby state to an active state (if not in the active state) so that $stage_2$ of the processing pipeline 520 will be ready to process the data 44 after process of the data 44 at $stage_1$ of the processing pipeline 520 is completed. A subsequent stage can be triggered after another stage (e.g., initial stage) within a processing path of the processing pipeline 520.

The power management module 560 can have module configured to trigger the stages of the processing pipeline 520 to change from one power state to another power state. In some embodiments, one or more portions of the power management module 560 can be a hardware-based module and/or a software-based module, and can be included in one or more modules. In some embodiments, the power management module 560 can be configured to change (or trigger changes of) the power states of one or more of the stages of the processing pipeline 520 using hardware-based control logic. More details related to hardware-controlled power states of stages of processing pipeline are described in connection with FIG. 6.

The physical-layer interface device 512 can be configured to convert the data 44 from a signal form received via the link 552 into bit values that can be processed by the processing pipeline 520. For example, the physical-layer interface device 512 can be configured to convert an optical signal received via link 552 into a series of bit values. In some embodiments, the physical-layer interface device 512 can be configured to send a ping signal 42 to the network 550 to notify the network 550 that the physical-layer interface device 512 is ready to receive data. In some embodiments, the physical-layer interface device 512 can function as an input port and/or as an output port.

The ping signal 42 can be used by one or more devices within the network 550 to define a topology of the network. Specifically, one or more devices within the network 550 can determine that the physical-layer interface device 512 is a valid destination (e.g., destination port) or source (e.g., source port) based on the ping signal 42. In some embodiments, physical-layer interface device 512 can be configured to communicate based on a protocol such as an Ethernet protocol and can be associated with layer-2 of the open systems interconnection (OSI) model.

In some embodiments, if the physical-layer interface device 512 is not in an active state when other portions of the access switch 500 are ready (e.g., in active state) to process data, the access switch 500 will not be able to receive data 44. In other words, in this embodiment, the physical-layer interface device 512 remains in an active state to receive data 44. Because the physical-layer interface device 512 can function as an input port and can send an indicator to the power management module 560 when data is received at the physical-layer interface device 512, one or more portions of the processing pipeline 520 can remain in a standby state until data (e.g., data 44) is received at the physical-layer interface device 512.

The data 44 can be received from a network 550 via a link 552. Specifically, the data can be received by, for example, a host device (not shown) within the network 550. In some embodiments, the network 550 can be, for example, a local area network (LAN) and/or a wide area network (WAN), and can be a wireless network and/or a wired network. The data processing module 510 can be included in an access switch 500, which can function as a gateway between the network 550 and the switch fabric 530. In some embodiments, the access switch 500, the switch fabric 530, and/or at least a portion of the network 550 can define at least a portion of a data center (not shown).

In some embodiments, the link 552 can be associated with a single network hop (e.g., a network step that cannot be defined topographically, or a network step associated with a link between one median access control (MAC) device and another MAC device). In some embodiments, the link 552 can be, for example, a wired link (e.g., a physical link) or a wireless link. In some embodiments, the link 552 can be referred to as a connection. In some embodiments, the link 552 can be a bi-directional link that can be half-duplex or full duplex.

Although not shown, in some embodiments, the stages within the processing pipeline 520 can be triggered to change from a standby state to an active state in response to a wake-up signal such as the wake-up signals described in connection with FIGS. 1-4. Accordingly, the wake-up signal can have one or more parameter values such as those described in connection with FIGS. 1-4. In addition, one or more of the stages can have a module configured to process and implement one or more parameter value(s) included in the wake-up signal. For example, the power management module 560 can be configured to define a wake-up signal targeted to $stage_1$ with a wake-time parameter value and a duration time parameter value. In some embodiments, the stages within the processing pipeline 520 can be triggered to change from an active state to a standby state in response to a sleep signal such as the sleep signals described in connection with FIGS. 1-4.

In some embodiments, the power management module 560 can be configured to receive a wake-up signal, such as wake-up signal 26 shown in FIG. 2. In response to the wake-up signal, the power management module 560 can be configured to wake-up a portion of the processing pipeline 520. Accordingly, the processing pipeline 226 shown in FIG. 2 can have an initial stage(s) configured to wake-up (triggered to wake-up by a power management module (not shown)) in response to the wake-up signal 26. Stages subsequent to the initial stage(s) can be triggered to serially wake-up as data (such as data 28) is being processed through the processing pipeline 226.

Referring back to FIG. 5, in some embodiments, the power management module 560 can be configured to initially trigger more than just one stage of the processing pipeline 520 to change from a standby state to an active state in response to data 44 being received at the physical-layer interface device 512. For example, the power management module 560 can be configured to trigger $stage_1$ and $stage_2$ of the processing pipeline 520 to change from a standby state to an active state in response to an indicator from the physical-layer interface device 512 that the data 44 has been received from at least a portion of the network 550. Also, as the data 44 is being processed through the processing pipeline 520, the power management module 560 can be configured to trigger more than one subsequent stage of the processing pipeline 520 to change from a standby state to an active state in response to data 44 being received at the physical-layer interface device 512. For example, as data 44 is being processed at $stage_1$ of the processing pipeline 520, the power management module 560 can be configured to trigger $stage_2$ and $stage_3$ (not shown) of the processing pipeline 520 to change from a standby state to an active state so that both of these stages of the processing pipeline 520 will be ready to process the data 44.

The stages (e.g., the number of stages) that are initially triggered and subsequently triggered to change from a standby state to an active state can be determined based on a processing latency of the stages within the processing pipeline 520. A time period (e.g., an estimated time period, an actual time period) during which data (such as data 44) is processed through a stage of the processing pipeline 520 can be referred to as the processing latency of the stage of the processing pipeline 520. For example, if processing through $stage_1$ of the processing pipeline 520 is relatively long (e.g., processing through $stage_1$ has a long processing latency), the power management module 560 can be configured to wait for a specified period of time before triggering $stage_2$ to wake-up. The wait time period can be determined based on the processing latency of $stage_1$. For example, the wait time period can be calculated based on a percentage of a minimum (e.g., an estimated minimum) processing latency of $stage_1$. In contrast, if the processing latency of $stage_1$ is relatively short, the power management module 560 can be configured to trigger $stage_2$ of the processing pipeline 520 to wake-up as soon as processing of the data 44 begins at $stage_1$. In some embodiments, the processing latency through one or more stages of the processing pipeline 520 can be, for example, several nano-seconds (e.g., 10 ns, 100 ns, 1000 ns).

In some embodiments, the power management module 560 can be configured to trigger one or more stages of the processing pipeline 520 to wake-up based on processing latencies associated with more than one stage of the processing pipeline 520. For example, the power management module 560 can be configured to wake-up $stage_3$ (not shown) of the processing pipeline 520 if the combined processing latency through $stage_1$ and $stage_2$ of the processing pipeline 520 is relatively short.

In some embodiments, the power management module 560 can be configured to store indicators of processing latencies associated with the stages of the processing pipeline 520. The indicators of the processing latencies can be stored in a table within a memory (not shown) that can be accessed by the power management module 560. In some embodiments, the table can be stored at the access switch 500 or at a different device that can be accessed by the power management module 560. In some embodiments, the indicators of the processing latencies included in the table can be dependent on one or more characteristics of the data (such as data 44) being processed through the stages of the processing pipeline 520. For example, a first indicator of a processing latency of $stage_1$ stored in the table can have relatively short value if the data is of a first type (or length) and a second indicator of a processing latency of $stage_2$ stored in the table have a relatively long value if the data is of a second type (or length). The different processing latencies can be retrieved by the power management module 560 based on the data type.

The power management module 560 can be configured to dynamically wake-up stages of the processing pipeline in response to the processing path of, for example, data 44 through the processing pipeline 520 changing. For example, if data 44 begins processing at $stage_1$ of the processing pipeline 520, and is scheduled to skip $stage_2$ of the processing pipeline 520, the power management module 560 can be configured to wake-up $stage_3$ of the processing pipeline 520 and subsequent stages of the processing pipeline 520 based on the processing latencies of the new processing path.

Although not shown, in some embodiments, the power management module 560 can be configured to trigger portions of processing pipelines (not shown) in addition to processing pipeline 520 to change power state (e.g., change from an active state to a standby state, and vice versa). Although not shown, in some embodiments, the power management module 560 can be configured to trigger (e.g., trigger asynchronously, trigger synchronously) portions of processing pipelines that have more than one parallel path to change power state.

Although not shown, in some embodiments, the processing pipeline 520 can be an output processing pipeline. For example, data can be processed through the processing pipeline 520 (e.g., processed through the processing pipeline 520 starting at $stage_N$) and sent out of the physical-layer interface device 512 to network 550. Accordingly, the power management module 560 can be configured to trigger one or more portions of the processing pipeline 520 to wake-up as data is processed through the processing pipeline 520 before the data is sent from the physical-layer interface device 512 to, for example, a host device within network 550.

Similar to the embodiment shown in FIG. 2, the access switch 500 has a schedule module 570. The schedule module 570 can be configured to send a request to transmit the data 44 via the switch fabric 530. In some embodiments, the data 44 can be queued at a queue (not shown) until the schedule module 570 has received authorization to trigger transmission of the data 44 via the switch fabric 530.

Figure 6:
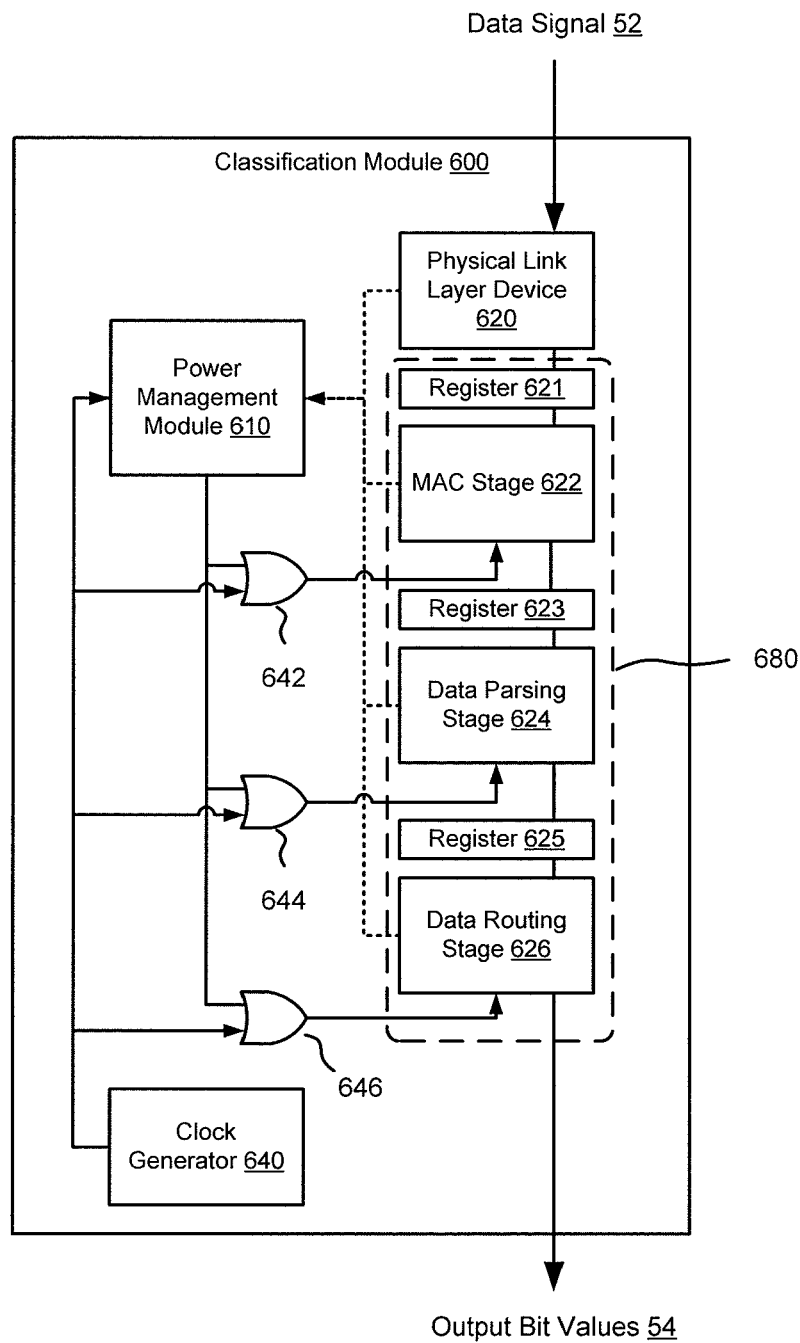
FIG. 6 is a schematic diagram that illustrates a power management module configured to manage power states associated with stages of a processing pipeline within a classification module, according to an embodiment.

FIG. 6 is a schematic diagram that illustrates a power management module 610 configured to manage power states associated with stages of a processing pipeline 680 within a classification module 600, according to an embodiment. The classification module 600 includes a physical link layer device 620 and a clock generator 640. The classification module 600 can be configured to process a data signal 52 based on a clock signal produced by the clock generator 640.

As shown in FIG. 6, the processing pipeline 680 includes a register 621, a MAC stage 622, a register 623, a data parsing stage 624, a register 625, and a data routing stage 626. The physical link layer device 620 can be configured to convert the data signal 52 into bit values that can be processed by the processing pipeline 680. The MAC stage 622 can be configured to perform MAC address look-up operations associated one or more portions of the bit values from the data signal 52. The data parsing stage 624 can be configured to parse portions of the bit values from the data signal 52 and classify one or more portions of the bit values from the data signal 52 based on a classification algorithm. The data routing stage 626 can be configured to trigger routing of the bit values from the data signal 52. The bit values from the data signal 52 can be transmitted from the processing pipeline 680 as output bit values 54.

In this embodiment, the bit values from the data signal 52 are latched in register 621, register 623, and register 625 during processing through the processing pipeline 680. For example, after the bit values from the data signal 52 are processed at the MAC stage 622, the bit values from the data signal 52 are latched in register 623 until they are released and sent to data parsing stage 624 for processing. The MAC stage 622, the data parsing stage 624, and the data routing stage 626 can be referred to as stages of the processing pipeline 680. In some embodiments, the processing latency of one or more of the stages (between registers) within the processing pipeline 680 can be hundreds of clock cycles (produced by the clock generator 640). In some embodiments, the processing latencies of the stages within the processing pipeline 680 can be more or less than hundreds of clock cycles.

The processing pipeline 680 can include various data classification components in addition to or different than those shown in processing pipeline 680. More details related to data (e.g., data packet) classification modules and their functions are set forth in co-pending patent application Ser. No. 12/242,172, filed on Sep. 30, 2008, entitled "Methods and Apparatus for Packet Classification based on Policy Vectors," and co-pending patent application Ser. No. 12/242,168, filed on Sep. 30, 2008, entitled "Methods and Apparatus related to Packet Classification associated with a Multi-Stage Switch," both of which are incorporated herein by reference in their entireties.

Each of the stages of the processing pipeline 680 can be configured to send an indicator to the power management module 610 related to the power state of the stage of the processing pipeline 680. Based on the indicators the power management module 610 can be configured to trigger one or more of the stages of the processing pipeline 680 to change power state. For example, if MAC stage 622 sends an indicator to the power management module 610 that the MAC stage 622 is active and processing bit values from the data signal 52, the power management module 610 can be configured to trigger the data parsing stage 624, which is after the MAC stage 622, to change to an active state from a standby state (if in the standby state rather than the active state). The data parsing stage 624 can be triggered by the power management module 610 to change state so that the data parsing stage 624 will be ready to process the bit values from the data signal 52 when the MAC stage 622 has completed processing of the bit values from the data signal 52.

In some embodiments, one or more of the stages of the processing pipeline 680 can be configured to change (or to be changed by the power management module 610) from an active state to a standby state after completing processing of data such as the bit value from the data signal 52. For example, the data parsing stage 624 can be configured to change from an active state to a standby state if the data parsing stage 624 has completed processing of data. In some embodiments, the data parsing stage 624 can be configured to change from an active state to a standby state only when the data parsing stage 624 has also not received an instruction (e.g., a wake-up signal) from the power management module 610 that the data parsing stage 624 should remain in an active state because data will be received shortly.

In some embodiments, one or more of the stages of the processing pipeline 680 can be configured to change from an active state to a standby state after expiration of a specified time period since processing has been completed. For example, the power management module 610 can be configured to change the data parsing stage 624 from an active state to a standby state if the data parsing stage 624 has not processed data for a specified period of time. In some embodiments, the power management module 610 can be configured to trigger the change in power state only if, for example, the stage within the processing pipeline 680 directly before the data parsing stage 624 is also in a standby state.

In some embodiments, the power management module 610 can be configured to trigger a stage of the processing pipeline 680 to change to a standby state. For example, the power management module 610 can be configured to trigger the data routing stage 626 to change from an active state to a standby state because one or more of the stages before the data routing stage 624, such as the data parsing stage 624, is in a standby state.

In some embodiments, the power management module 610 can be configured to receive an indicator of a power state of one or more of the stages in response to a request defined and sent from the power management module 610 to one or more of the stages of the processing pipeline 680. For example, the power management module 610 can be configured to request information from the data routing stage 626 related to the power state of the data routing stage 626. In response to the request, the data routing stage 626 can send an indicator of the power state of the data routing stage 626. In some embodiments, the power management module 610 can be configured to detect the power state of one or more of the stages of the processing pipeline 680.

As shown in FIG. 6, the power management module 610 is configured to change the power state of one or more of the stages of the processing pipeline 680 by enabling or disabling the clock signal (which is produced by the clock generator 640) to the stage(s) of the processing pipeline 680. The power management module 610 can disable the clock signal to a stage of the processing pipeline 680 by preventing the clock signal from being received at the stage of the processing pipeline 680. By preventing the clock signal from being received at the stage of the processing pipeline 680, the transistors (e.g., CMOS transistors) of the stage of the processing pipeline 680 will not be able to switch (e.g., flip), and thus, will consume less power than if allowed to switch. Also, the logical state of stage of the processing pipeline 680 will be held.

The power management module 610 can be configured allow the clock signal to be received at a stage of the processing pipeline 680. This can be referred to as enabling the clock signal to the stage of the processing pipeline 680. The power management module 610 can be configured to enable or disable the clock signal to the stages of the processing pipeline 680 using clock gates—clock gate 642, clock gate 644, and clock gate 646. In this embodiment, the clock gates are or-gates. In some embodiments, the clock gates can be defined by several gates (and/or transistors) that can be a different logical combination than that shown in FIG. 6.

For example, the MAC stage 622 can be changed from an active state to a standby state by preventing the clock signal from being received at the MAC stage 622 using the clock gate 642. Specifically, the power management module 610 can "or" the clock signal produced by the clock generator 640 with a high bit value or a low bit value. Accordingly, the transistors (e.g., CMOS transistors) of the MAC stage 622 will not be able to switch and a logical state of the MAC stage 622 will remain unchanged during the standby state. In other words, the MAC stage 622 will be in a non-switching standby state. When the MAC stage 622 is allowed to received the clock signal produced by the clock generator 640, the MAC stage 622 will be in an active state ready to process data based on the clock signal. Similarly, the data parsing stage 624 and the data routing stage 626 can be changed from one power state to another using clock gate 644 and clock gate 646, respectively.

Figure 7:
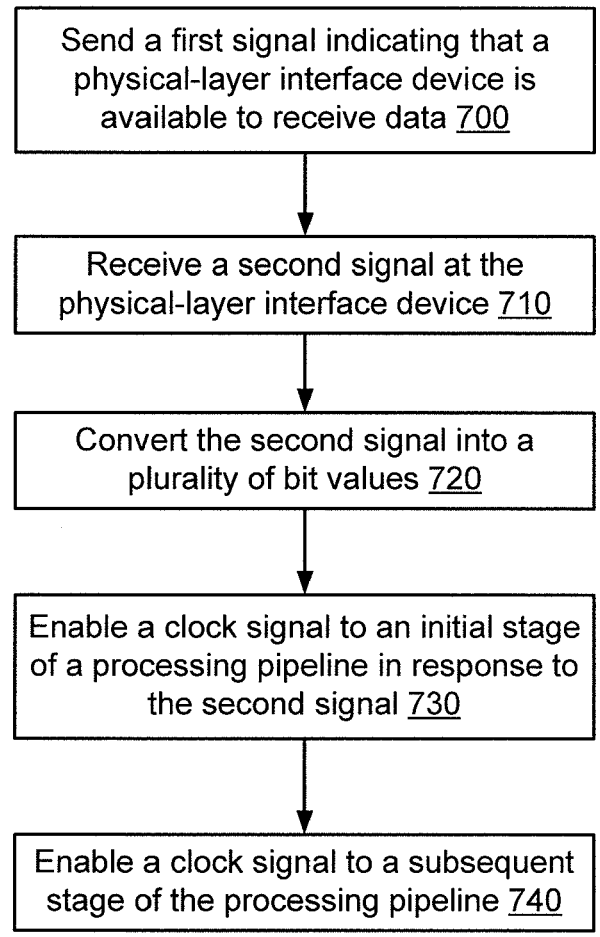
FIG. 7 is a flowchart that illustrates a method for changing a power state of a stage of a processing pipeline, according to an embodiment.

FIG. 7 is a flowchart that illustrates a method for changing a power state of a stage of a processing pipeline, according to an embodiment. As shown in FIG. 7, a first signal indicating that a physical-layer interface device is available to receive data is sent, at 700. The first signal can be a ping signal sent from the physical-layer interface device. The first signal can be an indicator to one or more devices within a network that the physical-layer interface device is ready to receive data.

A second signal is received at the physical-layer interface device, at 710. The second signal can be a data signal sent to the physical-layer interface device so that the data signal can be processed at a processing pipeline in communication with the physical-layer interface device. The second signal can be a digital signal sent via a link in communication with the physical-layer interface device.

The second signal is converted into multiple bit values by the physical-layer interface device, at 720. The physical-layer interface can be configured to convert the second signal into bit values that can be processed by a processing pipeline associated with the physical-layer interface device. The physical-layer interface device can include, for example, a phase-lock loop or other types of hardware that can be used to convert the second signal into bit values.

A clock signal to an initial stage of a processing pipeline is enabled in response to the second signal, at 730. The clock signal can be produced by a clock signal generator. The clock signal to the initial stage can be enabled (if necessary) by a power management module in response to the second signal being received at the physical-layer interface device. In some embodiments, the clock signal can be enabled in response to the second signal being converted into bit values at 720. In some embodiments, the clock signal to more than one stage of the processing pipeline can be enabled (if necessary) in response to the second signal being received at the physical-layer interface device. In some embodiments, the clock signal to more than one stage of the processing pipeline can be enabled based on a processing latency associated with the stage(s) of the processing pipeline.

A clock signal to a subsequent stage of the processing pipeline is enabled, at 740. The subsequent stage can be after the initial stage within a processing path of the processing pipeline. In some embodiments, the clock signal to the subsequent stage can be enabled (if necessary) by a power management module in response to processing being performed at the initial stage of the processing pipeline. In some embodiments, the clock signal to more than one stage of the processing pipeline can be enabled (if necessary) in response to processing being performed one or more stages before the subsequent stage of the processing pipeline. In some embodiments, the clock signal to more than one subsequent stage of the processing pipeline can be enabled based on a processing latency associated with the stage(s) of the processing pipeline.

Figure 8:
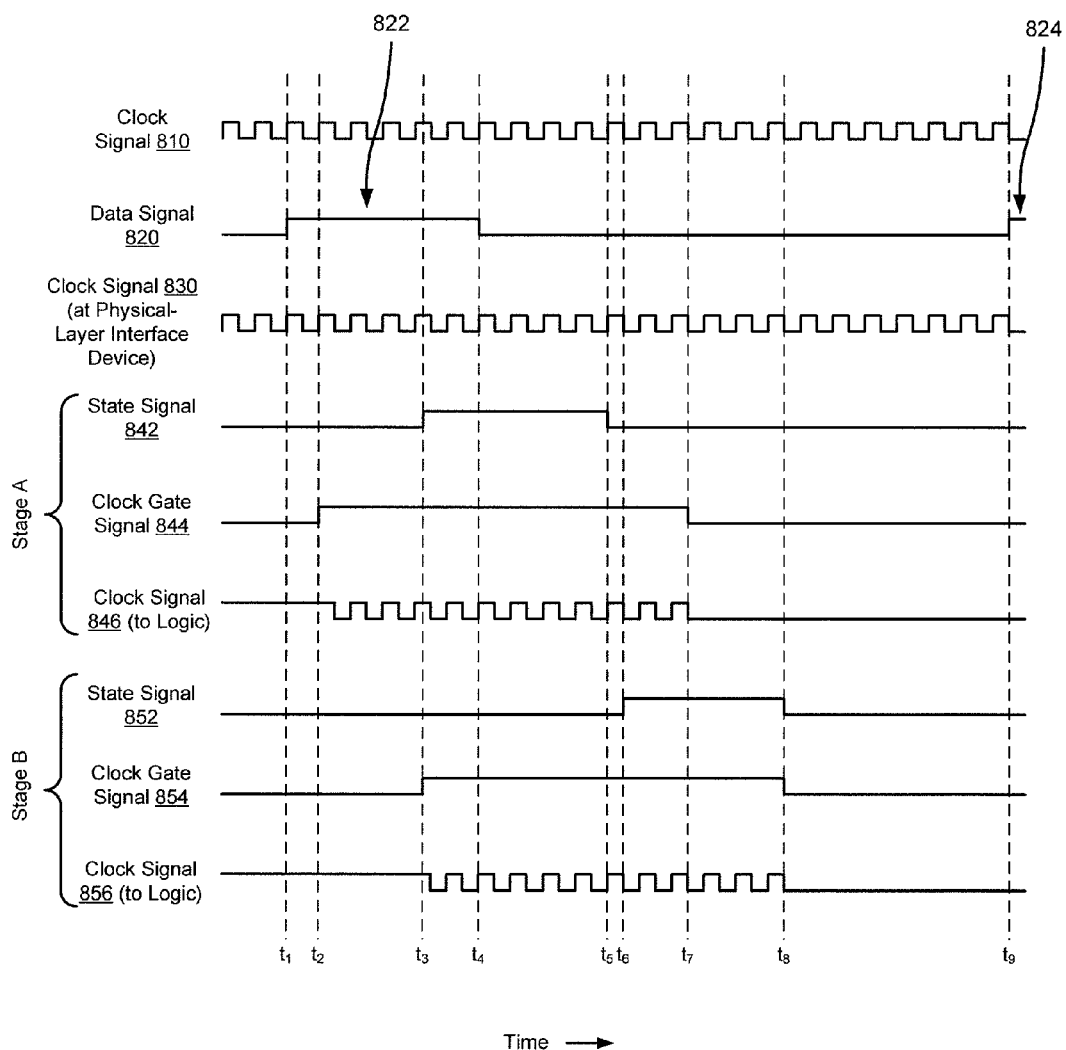
FIG. 8 is a schematic diagram that illustrates clock signal distribution to stages of a processing pipeline, according to an embodiment of an invention.

FIG. 8 is a schematic diagram that illustrates clock signal distribution to stages of a processing pipeline, according to an embodiment. In this embodiment, the processing pipeline includes at least stage A and stage B. As shown in FIG. 8, time is increasing to the right. Rising and falling edges of a clock signal 810, which can be produced by a clock signal generator, are substantially the same as the rising and falling edges of a clock signal 830 received at a physical-layer interface device because the clock signal 830 received at the physical-layer interface device is directly received from or derived from the clock signal 810. The time periods and clock cycles shown in FIG. 8 are presented by way of example and are not necessarily to scale.

As shown in FIG. 8, a data signal 820 indicates that a data packet 822 is received at the physical-layer interface device between time $t_1$ and time $t_4$ as indicated by the high value between time $t_1$ and time $t_4$. The duration of the data packet (time period between time $t_1$ and time $t_4$) can be, for example, several hundred nano-seconds (e.g., 100 ns, 200 ns).

In response to the data signal 820, a clock gate signal 844 associated with stage A of the processing pipeline is changed from a low value to a high value starting at time $t_2$ so that a clock signal 846 to logic (e.g., a sequence of logic gates) that defines stage A is enabled starting at approximately time $t_2$. The clock signal 846 substantially corresponds to the relevant portion of clock signal 810. In some embodiments, the clock gate signal 844 can be asserted by, for example, a power management module in response to the data signal 820.

As shown in FIG. 8, a state signal 842 associated with stage A is changed at time $t_3$ from a low value, which indicates a standby state, to a high value, which indicates an active processing state. The state signal 842 is changed at time $t_5$ from the high value to the low value when stage A is no longer actively processing the data packet.

As shown in FIG. 8, in response to the state signal 842 associated with stage A being changed at time $t_3$ from the low value to the high value, a clock gate signal 854 associated with stage B of the processing pipeline is changed from a low value to a high value starting at time $t_3$ so that a clock signal 856 to logic that defines stage B is enabled starting at approximately time $t_3$. The clock signal 856 substantially corresponds to clock signal 810.

A state signal 852 associated with stage B is changed at time $t_6$ from a low value to a high value when stage B is in an active processing state. The state signal 852 is changed at time $t_8$ from the high value to the low value when stage B is no longer actively processing the data packet. At time $t_8$, the state signal 852 and the clock gate signal 854 are changed to a low value. In response, the clock signal 856 to the logic of stage B is disabled.

In this embodiment, the clock signal 846 to the logic of stage A is enabled by the clock gate signal 844 for a specified period of time after stage A has completed processing as indicated by the state signal 842. Specifically, the clock signal 846 to the logic of stage A is enabled between time $t_5$ and time $t_7$ even though processing has been completed. The clock signal 846 to the logic of stage A can remain enabled based on a policy implemented by a power management module. In some embodiments, if an additional data packet had been received at the physical-layer interface device during the time period between time $t_5$ and time $t_7$, a power management module could be configured to continue to assert the clock gate signal 844 so that the clock signal 846 to the logic of stage A could remain enabled until the additional data packet has been processed at stage A.

As shown in FIG. 8, the data signal 820 changes from a low value to a high value at time $t_9$. This change indicates a leading edge of a subsequent data packet at the processing pipeline—data packet 824. In some embodiments, a time period between receipt of data packets at a processing pipeline (e.g., receipt of data packet 822 and receipt of data packet 824) can be relatively long compared to the processing latency associated with an individual data packet. In some embodiments, for example, the processing latency (e.g., 100 ns) of a data packet through a stage of a processing pipeline can be an order of magnitude shorter than a time period (e.g., 2 micro-seconds) between receipt of the data packet and receipt of a subsequent data packet. Accordingly, the stage of the processing pipeline can be in a power-saving standby state for a relatively long period of time compared with a power-consuming active state.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, a power management module can be configured to enable or disable multiple clock signals to multiple processing pipelines. In some embodiments, power states of stages of a processing pipeline can be managed by more than one power management module.

What is claimed is:

1. A method, comprising:
   receiving a request to transmit data from a first queue to a second queue via a switch fabric;
   sending, from a power management module, in response to the receiving and at a first time, a first wake-up signal including a wake-time parameter value and a duration time parameter value, the first wake-up signal configured to trigger a first stage from a plurality of stages of a processing pipeline in communication with the second queue to change from a first power state having a power level to second power state having a power level greater than the power level of the first power state; and
   sending, from a power management module, in response to the receiving and at a second time after the first time, a second wake-up signal, different from the first wake-up signal, configured to trigger a second stage from the plurality of stages to change from a third power state to a fourth power state.

2. The method of claim 1, wherein the sending is performed before the data is transmitted from the first queue to the second queue via the switch fabric.

3. The method of claim 1, wherein the first queue is associated with an ingress side of the switch fabric, the second queue is associated with an egress side of the switch fabric, the plurality of stages of the processing pipeline being associated with the egress side of the switch fabric.

4. The method of claim 1, wherein the switch fabric is a multi-stage switch fabric included in a core portion of a data center.

5. The method of claim 1, wherein the request is defined in response to an output of a classification algorithm based on the data.

6. The method of claim 1, wherein the second queue is within an access switch operatively coupled to the switch fabric, the processing pipeline being within the access switch.

7. The method of claim 1, wherein the receiving includes receiving, at a power management module within an access switch, the request to transmit data, the second queue and the processing pipeline being within the access switch.

8. The method of claim 1, wherein the power level of the first power state is zero.

9. A method, comprising:
  receiving an authorization signal indicating that transmission of data from a source entity to a destination entity via a switch fabric is authorized, the destination entity being separate from the switch fabric and including a plurality of stages; and
  defining, in response to receiving, a first wake-up signal including a first wake-time parameter value, and a second wake-up signal different from the first wake-up signal; and
  sending, from a power management module, (1) the first wake-up signal including the first wake-time parameter value to a first stage from the plurality of stages and (2) the second wake-up signal to a second stage from the plurality of stages, such that the first stage and the second stage are sequentially changed from a first power state to a second power state as the data is received at the plurality of stages.

10. The method of claim 9, wherein the authorization signal is defined based on an availability of a queue associated with the destination entity on an egress side of the switch fabric.

11. The method of claim 9, further comprising:
  receiving a request to transmit data from the source entity to the destination entity via the switch fabric, the request being defined in response to an output of a classification algorithm based on the data.

12. The method of claim 9, wherein the defining includes defining at a schedule module associated with at least one of the source entity on an ingress side of the switch fabric, the switch fabric, or the portion of the destination entity on an egress side of the switch fabric.

13. The method of claim 9, wherein the defining includes defining, at the power management module, the first wake-up signal and the second wake-up signal, the power management module being within the destination entity.

14. The method of claim 9, wherein the first power state is associated with a first power level, the second power state being associated with a second power level greater than the first power level.

15. An apparatus, comprising:
  a physical-layer interface module within an access switch configured to be operatively coupled to a switch fabric, the access switch being physically distinct from the switch fabric, the physical-layer interface module when active transmitting via a link to the switch fabric a first signal including a wake-time parameter value, the first signal indicating that the physical-layer interface module is available to receive a second signal from the switch fabric via the link, the physical-layer interface module when active converting the second signal into a plurality of bit values, the second signal being different than the first signal;
  a processing pipeline, within the access switch and in communication with the physical-layer interface module and having a plurality of stages; and
  a power management module, within the access switch, the power management module when active, in response to the second signal based on a plurality of bit values, sending (1) a first clock signal at a first time to a first stage from the plurality of stages and (2) a second clock signal different from the first clock signal at a second time to a second stage from the plurality of stages, such that the first stage and the second stage are sequentially enabled.

16. The apparatus of claim 15, wherein the processing pipeline when active classifies packets associated with the second signal.

17. The apparatus of claim 15, wherein at least a portion of the plurality of bit values being processed at a first stage from the plurality of stages.

18. The apparatus of claim 15, wherein the power management module when active disables the first clock signal when the first stage from the plurality of stages is idle for a specified period of time.

19. The apparatus of claim 15, wherein the physical-layer interface module is an interface module when active defining an endpoint within a topology of a network.

20. The apparatus of claim 15, wherein the plurality of bit values is a first plurality of bit values, the processing pipeline defining when active a second plurality of bit values based on the first plurality of bit values, the apparatus further comprising:
  the switch fabric when active receiving the second plurality of bit values and routing when active the second plurality of bit values based on an output from the processing pipeline associated with the first plurality of bit values.

21. The apparatus of claim 15, further comprising:
  a first schedule module when active receiving a wake-up signal from at least one of the switch fabric or a second schedule module, the power management module when active enabling the first clock signal from the plurality of clock signals to the first stage from the plurality of stages in response to the wake-up signal.

22. The apparatus of claim 15, wherein the processing pipeline has a register disposed between the first stage from the plurality of stages and the second stage from the plurality of stages.

23. The apparatus of claim 15, wherein the plurality of bit values define at least a portion of a data packet.

* * * * *